United States Patent
Schu

(10) Patent No.: US 6,873,742 B2
(45) Date of Patent: Mar. 29, 2005

(54) METHOD AND CIRCUIT ARRANGEMENT FOR ENHANCING THE CONTRAST OF AN IMAGE

(75) Inventor: Markus Schu, Erding (DE)

(73) Assignee: Infineon Technologies AG, Munich (DE)

(*) Notice: Subject to any disclaimer, the term of this patent is extended or adjusted under 35 U.S.C. 154(b) by 617 days.

(21) Appl. No.: 10/054,296

(22) Filed: Nov. 13, 2001

(65) Prior Publication Data

US 2002/0136464 A1 Sep. 26, 2002

Related U.S. Application Data

(63) Continuation of application No. PCT/DE00/01689, filed on May 25, 2000.

(30) Foreign Application Priority Data

Jun. 15, 1999 (DE) .......................................... 199 27 295

(51) Int. Cl.[7] .............................................. G06K 9/40
(52) U.S. Cl. ...................... 382/274; 382/252; 382/260; 382/275; 358/3.26; 358/3.27; 358/463
(58) Field of Search ................................ 382/218, 219, 382/252, 260, 263, 264, 274, 275; 358/3.26, 3.27, 520, 450, 463

(56) References Cited

U.S. PATENT DOCUMENTS

| | | | |
|---|---|---|---|
| 4,489,349 A | | 12/1984 | Okada |
| 5,862,254 A | | 1/1999 | Kim et al. |
| 5,940,049 A | * | 8/1999 | Hinman et al. ............... 353/20 |
| 5,974,113 A | * | 10/1999 | Bruijns et al. ............. 378/98.7 |
| 6,011,874 A | * | 1/2000 | Gluckstad ................... 382/276 |
| 6,377,206 B1 | * | 4/2002 | Petty .......................... 342/159 |
| 6,473,517 B1 | * | 10/2002 | Tyan et al. .................. 382/105 |
| 6,549,322 B1 | * | 4/2003 | Taravade .................... 359/279 |

FOREIGN PATENT DOCUMENTS

| | | |
|---|---|---|
| EP | 0654 943 | 5/1995 |
| EP | 0723 364 | 7/1996 |
| EP | 0798 919 A2 | 10/1997 |
| EP | 0810 551 | 12/1997 |

OTHER PUBLICATIONS

*Iwainsky et al.*, Lexikon Der Computergrafik und Bildverarbeitung, pp. 168–169.
*Kim*, IEEE Transactions on Consumer Electronics, vol. 43, No. 1, "Contrast Enhancement Using Brightness Preserving Bi–Histogram Equalization", pp. 1–8.
IBM Technical Disclosure Bulletin, vol. 28, No. 3, Aug. 1985, "Automatic Image Brightness Scaling" pp. 1250–1252.

* cited by examiner

*Primary Examiner*—Bhavesh M. Mehta
*Assistant Examiner*—Yosef Kassa
(74) *Attorney, Agent, or Firm*—Marshall, Gerstein & Borun LLP

(57) ABSTRACT

A method and apparatus for enhancing the contrast of an image, where pixels of the image having a brightness less than a mean brightness of the image are transformed in accordance with a first straight-line function, and pixels having a brightness greater than the mean brightness of the image are transformed in accordance with a second straight-line function. Variable slope factors of the two straight-line functions are determined by an analysis of the brightness distribution of the transformed output image. The pixels, thus transformed, produce the contrast-enhanced output image.

28 Claims, 6 Drawing Sheets

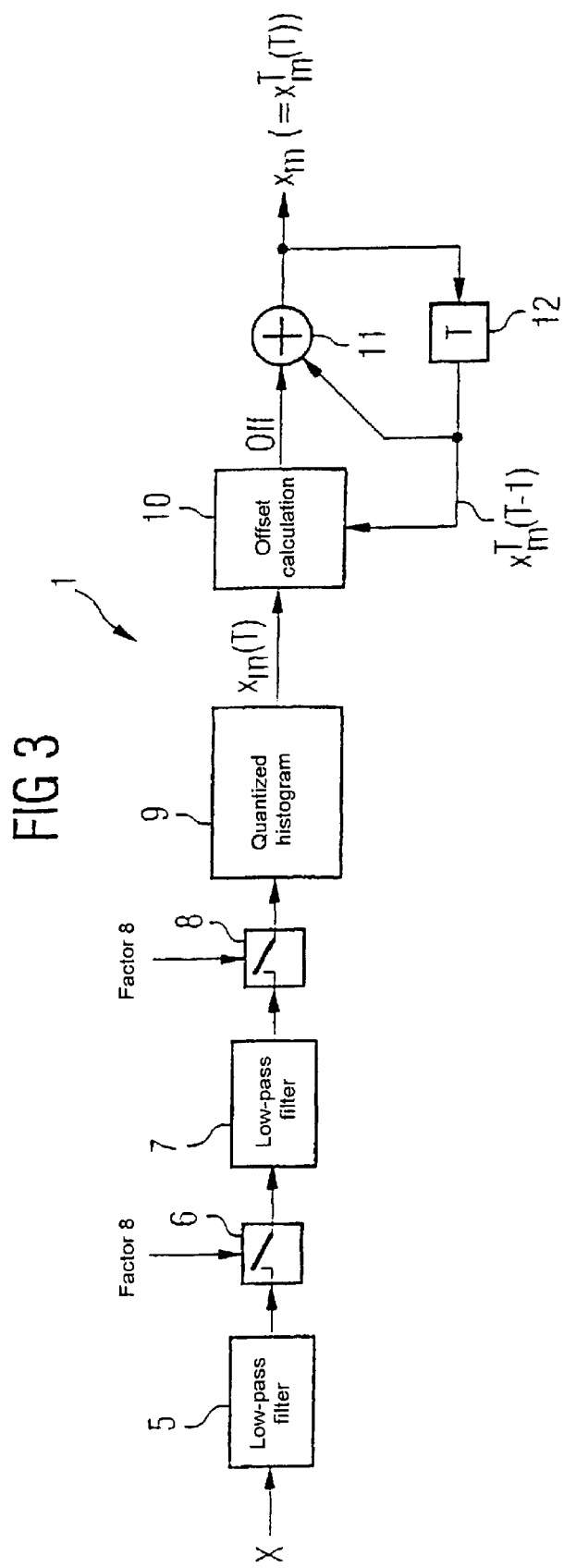

METHOD AND CIRCUIT ARRANGEMENT FOR ENHANCING THE CONTRAST OF AN IMAGE

RELATED APPLICATIONS

This is a continuation of International Application Serial No. PCT/DE00/01689, with an international filing date of May 25, 2000, published in German under PCT Article 21(2).

FIELD OF INVENTION

The present invention relates to a method and a circuit arrangement for automatically enhancing the contrast of an image.

BACKGROUND OF INVENTION

It is often the case with digitized images that the entire available dynamic range (i.e., the maximum possible resolution of the brightness values) is not utilized, which, however, results in a lower contrast of the image. This applies, in particular, to older image originals (black/white feature films, etc), for example. As a result, the images appear blurred, dark and matt when they are reproduced.

Known methods for enhancing contrast are based on the density distribution of the pixels in the image and spread the dynamic range of the image, with a result that the corresponding image is more brilliant and sharper. One example thereof is the so-called histogram spreading, which has the aim of producing the flattest possible density distribution in the image, which corresponds to a relatively large contrast. Mathematically, the variance/variation is increased in this case, the contrast being proportional to the variance/variation. Applications of histogram spreading are found, in particular, in the field of medicine and radar image processing.

The principle of histogram spreading will be briefly explained in more detail below. Each image comprises i lines and j columns, so that each pixel can be designated by X(i,j), where X(i,j) describes the intensity of the image at the local position i,j in the form of a discrete brightness value. The entire image can accordingly be expressed by $\{X(i,j)\}$. In the case of an 8-bit resolution, a total of L=256 discrete brightness levels are possible, which are hereinafter designated by $x_0, x_1 \ldots x_{L-1}$.

For a given image X, its density function $p(x_k)$ is defined as follows:

$$p(x_k) = \frac{n(x_k)}{N} \qquad (1)$$

In this case, k=0, 1, 2 ... L−1, and N denotes the number of all the pixels in the input image X, while $n(x_k)$ denotes the number of those pixels which have the discrete brightness value $x_k$ in the input image X.

The representation of the density function $p(x_k)$ against $x_k$ is referred to as a histogram of the image X. The density function of an image X is represented by way of example in FIG. 6A.

The cumulative density function of an image X is defined as:

$$c(x_k) = \sum_{j=0}^{k} p(x_j) \qquad (2)$$

By definition, $C(x_{L-1})=1$. Consequently, the cumulative density function $c(x_k)$ corresponds to the integral over the density function $p(x_k)$.

In the case of histogram spreading, the input image is then converted or transformed into an output image using the cumulative density function, the entire dynamic range being utilized. The transformation function used in this case is defined as:

$$f(x_k)=x_0+(x_{L-1}-x_0)*c(x_k) \qquad (3)$$

The transformed output image Y=f(x) obtained by this transformation has an enhanced contrast. The density function of the output image processed in this way is represented in FIG. 6B. FIG. 6B reveals, in particular, that the output image has a greater variation of the brightness values. In other words, the histogram spreading results in a flatter and wider brightness density distribution.

The image revised by the histogram spreading not only has an enhanced contrast but, moreover, is distinctly brighter than the input image, and this can also be gathered from the density function of the output image as shown in FIG. 6B. This fact is a result of the histogram spreading, which converts or transforms the input values into a corresponding output value independently of the respective input value with the aid of the cumulative density function. The unnatural elevation of the contrast becomes particularly conspicuous for example in ground or sky areas of an image, which corresponds to overmodulation of the range of values of the output image. Consequently, although the contrast is enhanced with the aid of histogram spreading, the overall image impression is worse than in the original input image, the reason for this being based, inter alia, on the fact that the mean brightness of the image is not taken into account at all in the calculation. On account of these disadvantages, the method of histogram spreading presented above is only rarely used in products appertaining to consumer electronics, such as in television sets, for example. IEEE Transactions on Consumer Electronics, Vol. 43, No. 1, February 1997, "Contrast Enhancement Using Brightness Preserving Bi-Histogramm Equalization", Y.-T. Kim, proposes a further-developed method for contrast enhancement based on histogram spreading. The method described in this document uses two different histogram spreads for two different sub-images obtained by decomposing the input image into pixels having a brightness respectively greater or less than the mean brightness of the input image. This method will be briefly explained in more detail below.

Firstly, suppose that $x_m$ denotes the mean brightness of the input image X. The input image can accordingly be decomposed into two sub-images $X_L$ and $X_U$ where $X=X_L \cup X_U$, $X_L=\{X(i,j)|X(i,j)\leq x_m, \forall X(i,j)\in X\}$ and $X_U=\{X(i,j)|X(i,j)>x_m, \forall X(i,j)\in X\}$. Consequently, the sub-image $X_L$ comprises all the pixels of the input image X which have a brightness less than or equal to the mean brightness $x_m$ of the input image, while the sub-image $X_U$ comprises all the pixels of the input image X which have a brightness greater than the mean brightness $x_m$. The following density functions can be defined for the two sub-images:

$$p_L(x_k) = \frac{n_L(x_k)}{N_L} \qquad (4)$$

In this case, $N_L$ denotes the total number of pixels in the sub-image $X_L$ and $n_L(x_k)$ denotes the number of pixels having the brightness value $x_k$ in the sub-image $X_L$, where the following holds true for the sub-image $X_L$: $k=0, 1 \ldots x_m$:

$$p_U(x_k) = \frac{n_U(x_k)}{N_U} \qquad (5)$$

For the sub-image $X_U$, in an analogous manner, $N_U$ denotes the total number of pixels in the sub-image $X_U$ and $n_U(x_k)$ denotes the number of pixels having the brightness value $x_k$ in the sub-image $X_U$, where the following holds true for the sub-image $X_U$: $k=x_{m+1}, \ldots x_{L-1}$. Equally, corresponding cumulative density functions for the two sub-images $X_L$ and $X_U$ can be defined as follows:

$$c_L(x_k) = \sum_{j=0}^{k} p_L(x_j) \qquad (6)$$

$$c_U(x_k) = \sum_{j=0}^{k} p_U(x_j) \qquad (7)$$

By definition, the following must hold true: $c_L(x_m)=1$ and $c_U(x_{L-1})=1$. For the two sub-images, separate transformation functions $f_L(x_k)$ and $f_U(x_k)$ are now defined:

$$f_L(x_k)=x_0+(x_m-x_0)*c_L(x_k) \qquad (8)$$

$$f_U(x_k)=x_{m+1}+(x_{L-1}-x_{m+1})*c_U(x_k) \qquad (9)$$

The brightness values of the two sub-images $X_L$ and $X_U$ are thus processed or transformed with the aid of different transformation functions, the transformed sub-images, when combined, producing the desired output image Y having enhanced contrast:

$$Y=f(X)=f_L(X_L) \cup f_U(X_U) \qquad (10)$$

This method spreads the input image X over the entire dynamic range $[x_0, x_{L-1}]$, the following boundary condition holding true: the pixels having a brightness less than or equal to the mean brightness value $x_m$ being spread in the range $[x_0, x_m]$ and the pixels having a brightness greater than the mean brightness value being spread in the range $[x_{m+1}, x_{L-1}]$.

A circuit arrangement for realizing this method is illustrated in FIG. 7, the input image X being fed to a unit 22 for histogram calculation. Furthermore, a mean value calculation unit 24 for calculating the mean brightness value $x_m$ of the input image X is provided. The histogram determined for the input image X is divided as a function of the calculated mean brightness value $x_m$ in a further histogram division unit 23 in accordance with the sub-images $X_L$ and $X_U$. Calculation units 26 and 27 are provided, in order to calculate the corresponding cumulative density functions $c_L(x_k)$ and $c_U(x_k)$, respectively, for the two sub-images $X_L$ and $X_U$, respectively. In a mapper 28, the previously described transformation functions $f_L(x_k)$ and $f_U(x_k)$, respectively, are calculated using the calculated cumulative density function and the sub-images thus transformed are combined to form a transformed output image Y. Since the individual calculations have to be carried out during the duration of an image, an image memory 25 is required.

However, the image memory 25 shown in FIG. 7 can also be dispensed with since there is a high degree of correlation between two directly successive images. Equally, quantization of the histogram is also possible.

The previously referenced document, discussed above, does not make any statements at all, however, with regard to how it is possible to solve various problems that arise in the current image, such as image bouncing or switching artifacts in the case of an excessively fast or excessively slow change in the contrast or transformation function, for example. Equally, there is no discussion of how to handle images that already have a good contrast. Equally, no proposals at all are made for the actual realization of the calculation of the mean brightness value $x_m$.

SUMMARY OF THE INVENTION

The present disclosure proposes an improved method and corresponding circuit arrangement for enhancing the contrast of an image comprising a plurality of pixels. In particular, the disclosed method and apparatus enables the contrast of the image to be enhanced, inter alia, as a function of the contrast already present in the image, it being ensured, however, that the overall impression of the processed output image is at least just as good as that of the original input image, and, moreover, the problems described above in connection with the prior art being eliminated.

A method effected in accordance with the teachings of the present invention is disclosed for enhancing the contrast of an image where the image is composed of a multiplicity of pixels each having a specific brightness value. The method first determines a mean brightness value of the individual pixels of the image and subsequently processes the brightness values of those pixels of the image that have a brightness less than or equal to the mean brightness value, in accordance with the first transformation function. The brightness values of those pixels of the image that have a brightness greater than the mean brightness value are processed in accordance with a second transformation function. Finally, the pixels having brightness values processed are output in the form of a transformed output image. Moreover, the first transformation function is a first straight-line function having a first variable slope factor. Similarly, the second transformation function is a second straight-line function having a second variable slope factor. The first and second slope factors of the straight-line functions are determined by an analysis of the transformed output image.

An apparatus constructed in accordance with the teachings of the present invention is also disclosed for enhancing the contrast of an image, wherein the image is comprised of a plurality of individual pixels each having a specific brightness value. The apparatus includes a mean value calculation unit that is configured to determine a mean brightness value of the individual pixels of the image. A first transformation function calculation unit is also included and configured to determine a first transformation function that is used to process a first set of pixels of the image having a brightness less than or equal to the mean brightness value. Similarly, a second transformation function calculation unit is included and configured to determine a second transformation function that is used to process a second set of pixels of the image having a brightness greater than the mean brightness value. The apparatus further includes an image processing unit configured for processing the brightness values of the first set of pixels of the image in accordance with the first transformation function and the brightness values of the second set of pixels of the image in accordance with the second transformation function. The image processing unit outputs the processed pixels in the form of a transformed output image. The first and second transformation function calculation units are further configured to respectively determine a first straight-line function and a second straight-line function by analyzing the transformed output image. The first and second straight-line functions respectively have a variable slope factor as the corresponding first and second transformation functions.

BRIEF DESCRIPTION OF THE DRAWINGS

FIG. 3 shows the construction of a unit for calculating the mean brightness value as shown in FIG. 1.

DETAILED DESCRIPTION OF PREFERRED EMBODIMENTS

According to the teachings of the present invention, the mean brightness is maintained (i.e., a pixel having a brightness corresponding to the mean brightness of the input image does not change its brightness upon application of the contrast enhancement). Additionally, straight-line functions having variable slope factors are used as the transformation functions, in which case the two straight-line functions intersect in particular at the mean brightness value $x_m$ and can be defined by the following functions:

$$f_L(x_k) = x_m + (x_k - x_m) * a_L | x_k \leq x_m \quad (10)$$

$$f_U(x_k) = x_m + (x_k - x_m) * a_U | x_k \geq x_m \quad (11)$$

In this case, $x_m$ denotes the mean brightness value, $x_k$ denotes the respective brightness value to be processed of the sub-image $X_L$ and $X_U$, respectively, $a_L$ denotes the slope factor of the transformation function $f_L(x_k)$ and $a_U$ denotes the slope factor of the transformation function $f_U(x_k)$. The transformation function $f_L(x_k)$ is exclusively applied to the pixels of the sub-image $X_L$, which only has pixels having brightness values less than or equal to the value of the mean brightness $x_m$ ($x_k \leq x_m$). Furthermore, the transformation function $f_U(x_k)$ is exclusively applied to the pixels of the sub-image $X_U$, which only has pixels having brightness values greater than the value of the mean brightness $x_m$ ($x_k \geq x_m$). With regard to the definition of the sub-images $X_L$ and $X_U$, in order to avoid repetition, reference may be made at this juncture to the previous explanations with regard to the background art, since these apply analogously to the present invention.

Figure 2:
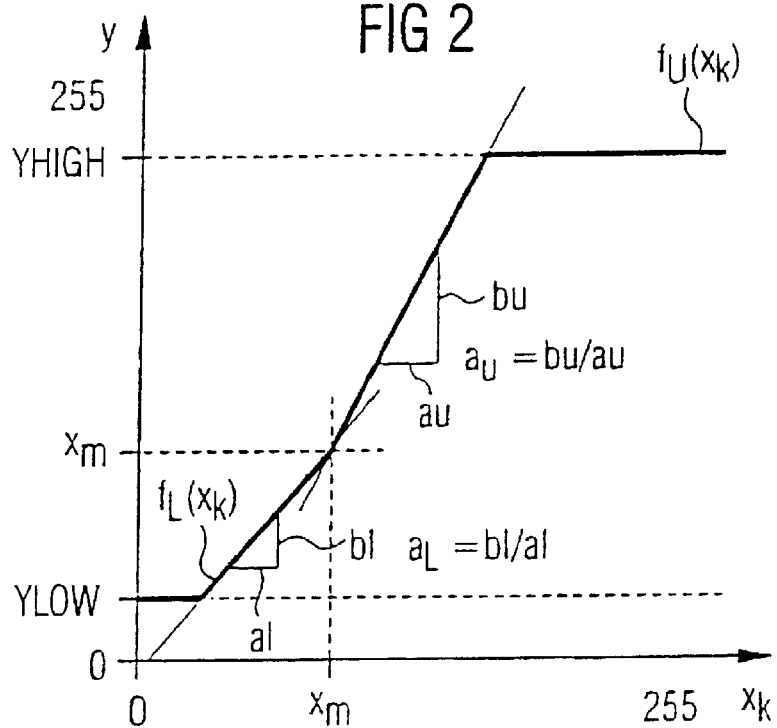
FIG. 2 shows a representation for elucidating the transformation functions used in accordance with FIG. 1.

FIG. 2 represents the profile of the two transformation functions, the slope triangles additionally being detected in each case, so that the slope $a_L$ of the transformation function $y = f_L(x_k)$ is produced by $a_L = bl/al$ and the slope $a_U$ of the transformation function $y = f_U(x_k)$ is produced by $a_U = bu/au$. Equally, FIG. 2 reveals that the two transformation functions intersect at the point of intersection $(x_m, x_m)$. The transformed brightness values y are limited to a maximum value YHIGH and a minimum value YLOW, so as that the transformed brightness values of the output image $Y = f(X) = f_L(x_k) \cup f_U(x_k)$ can only assume values within the range of values [YLOW, YHIGH].

The above-described functions in accordance with the formulae (10) and (11) can, in principle, also be derived from the formulae (8) and (9), respectively, assuming the following relationships:

$$c_L(x_k) = 1 - \frac{(x_m - x_k)}{(x_m - x_0)} * a_L \quad (12)$$

$$c_U(x_k) = \frac{(x_k - x_{m+1})}{(x_{L-1} - x_{m+1})} * a_U \quad (13)$$

However, instead of calculating the cumulative density functions $c_L(x_k)$ and $c_U(x_k)$, the invention only requires the calculation of the two slope values $a_L$ and $a_U$, with the result that the calculation complexity is distinctly reduced.

Figure 1:
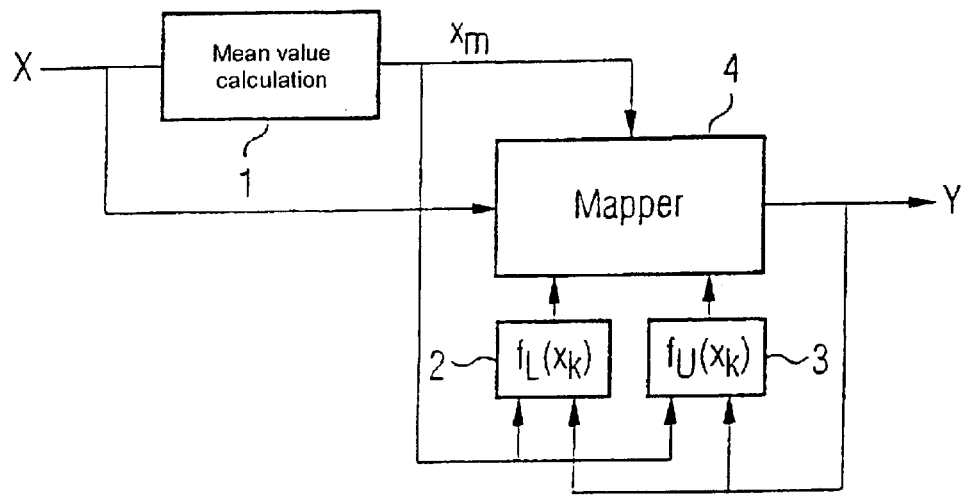
FIG. 1 shows a simplified block diagram of a circuit arrangement in accordance with the teachings of the invention for enhancing the contrast of an input image.

FIG. 1 illustrates a simplified block diagram of a circuit arrangement for realizing the method described above. An input image X to be processed is fed to a unit 1 for mean value calculation. This unit 1 determines the value $x_m$ of the mean brightness of the input image X in accordance with an algorithm that will be described in more detail below. Furthermore, transformation function calculation units 2 and 3 are provided, which, as a function of the mean brightness value $x_m$ and specific properties of the output image Y, determine the slope factors $a_L$ and $a_U$, respectively (i.e., the transformation functions $f_L(x_k)$ and $f_U(x_k)$, respectively) and communicate them to a mapper 4. The slope factors $a_L$ and $a_U$ are thus calculated from the output image Y, which corresponds to closed-loop control. In accordance with the transformation functions $f_L(x_k)$ and $f_U(x_k)$, an image processing unit or mapper 4 subjects the brightness values of the input image X and of the two sub-images $X_L$ and $X_U$, respectively, to a transformation and outputs the transformed output image Y.

The calculation of the mean brightness value $x_m$ by the unit 1 will be explained below, with FIG. 3 illustrating one possible realization of this mean value calculating unit 1.

In the calculation of the mean value, a distinction is made between a spatial mean value and a temporal mean value. The spatial mean value is calculated for each input image X by the input image being subjected to low-pass filtering and then subsampled by the factor 8. This is done twice in accordance with FIG. 3, two low-pass filters 5, 7 and two subsampling devices 6, 8 being provided for this purpose. This procedure reduces the number of pixels overall by the factor 64. From the pixels that have thus remained, a quantized histogram is calculated with the aid of a corresponding unit 9 (i.e., the unit 9 determines a quantized brightness distribution of the reduced input image). In this case, the unit 9 uses the following quantized density function $p_Q(x_q)$, where $x_q$ denotes the different quantized brightness values and q denotes the number of the respective quantization level, and it is assumed that each quantization level comprises 32 brightness values $x_k$.

$$p_Q(x_q) = \sum_{1=32*q}^{(q+1)*32-1} p(x_1) \tag{14}$$

Figure 4A:
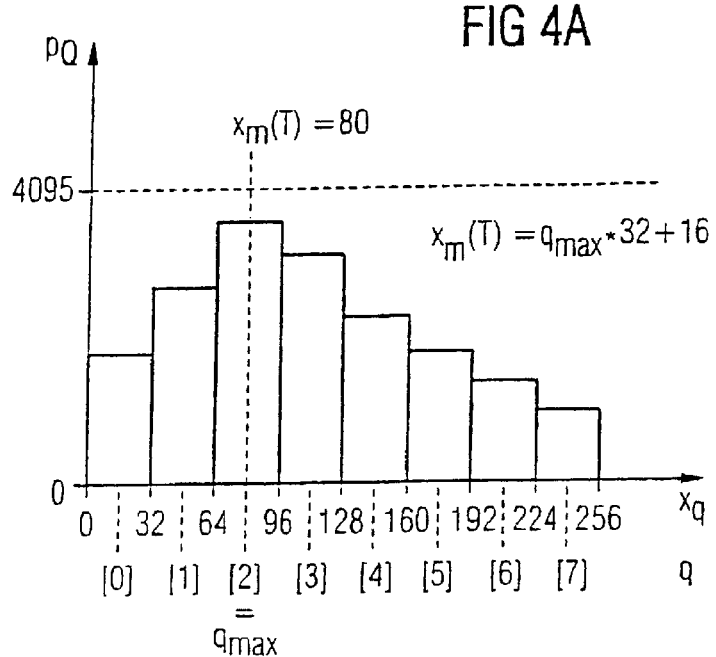
FIGS. 4A and 4B show representations for elucidating the method of operation of the unit for calculating the mean brightness value as shown in FIG. 3.

FIG. 4A represents an example of a corresponding quantized histogram for the case of 8-bit resolution with 256 different brightness values (L=256) and eight different quantization levels (q=0, 1 . . . 7).

Figure 4B:
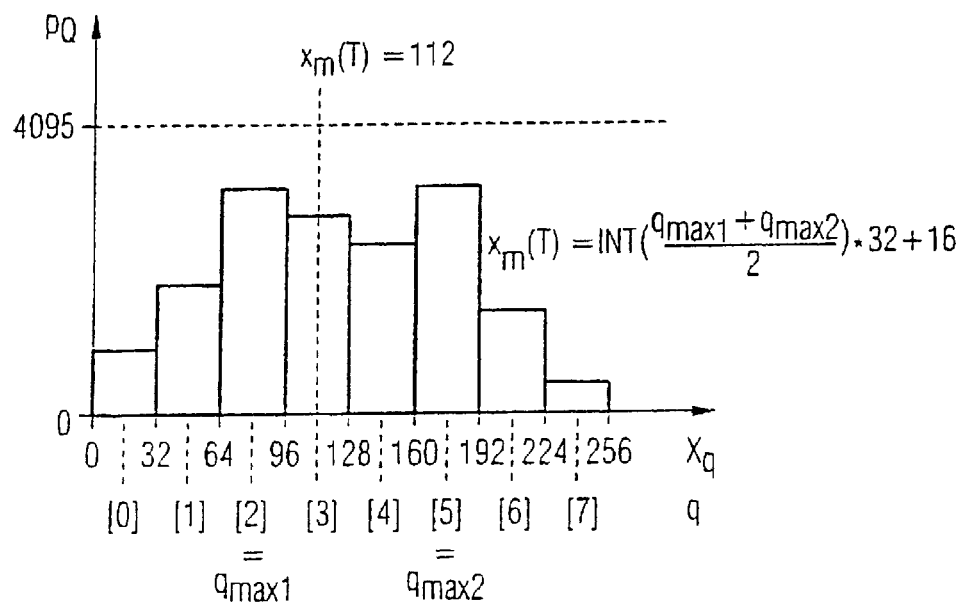

The quantized histogram is then used to calculate the spatial mean value in accordance with the formula $x_m(T)= q_{max}*32+16$ (or generally $x_m(T)=q_{max}*(L/q)+L/(2q)$). In this case, $q_{max}$ denotes that quantization level which has the bar having the maximum value in the quantized histogram. Consequently, $q_{max}=2$ in the exemplary quantized histogram shown in FIG. 4A, with the result that the value 80 is produced for the spatial mean value $x_m(T)$. By contrast, if a plurality of bars have the maximum value, the rounded-down mean value of the numbers of the corresponding quantization levels is used to calculate $x_m(T)$ (i.e., in the example shown in FIG. 4B, the value INT((2+5)/2)=3 is used as $q_{max}$ in the above-described formula for $x_m(T)$).

As is shown in FIG. 3, after the determination of the spatial mean value $x_m(T)$, an offset value Off is calculated by comparing the spatial mean value with the temporal mean value of the preceding image. For this purpose, a corresponding unit 10 is provided, which, as a function of the spatial mean value $x_m(T)$ of the instantaneous image and the temporal mean value $x^T_m(T-1)$ of the preceding image, chooses the offset value Off in such a way that $x_m=x^T_m(T)=x^T_m(T-1)+$Off holds true. In this case, the unit 10 selects the offset value Off from a set {-OFFSET, . . . , -1, 0, 1, . . . , OFFSET}, the parameter OFFSET being freely programmable and being chosen such that the temporal mean value always moves in the direction of the present spatial mean value. In particular, OFFSET=1 may be chosen, so that only the values -1, 0 and 1 are considered for the offset value Off. In this way, the newly calculated temporal (and spatial) mean value $x^T_m(T)$ of the instantaneous image is output as the desired mean brightness value $x_m$.

Switching artifacts and bounce artifacts are avoided by virtue of the above-described quantization of the histogram, on the one hand, and the limiting of the temporal change of the mean value, on the other hand.

The further parameters required for carrying out the contrast enhancement method according to the invention, namely the slope values $a_L$ and $a_U$, are obtained by an analysis of the output image Y generated by the mapper 4 shown in FIG. 1, which is equivalent to closed-loop control of these slope values. A corresponding circuit arrangement is illustrated in FIG. 5, where the functionality of this circuit arrangement should be assigned to the units 2 and 3 shown in FIG. 1.

Figure 5:
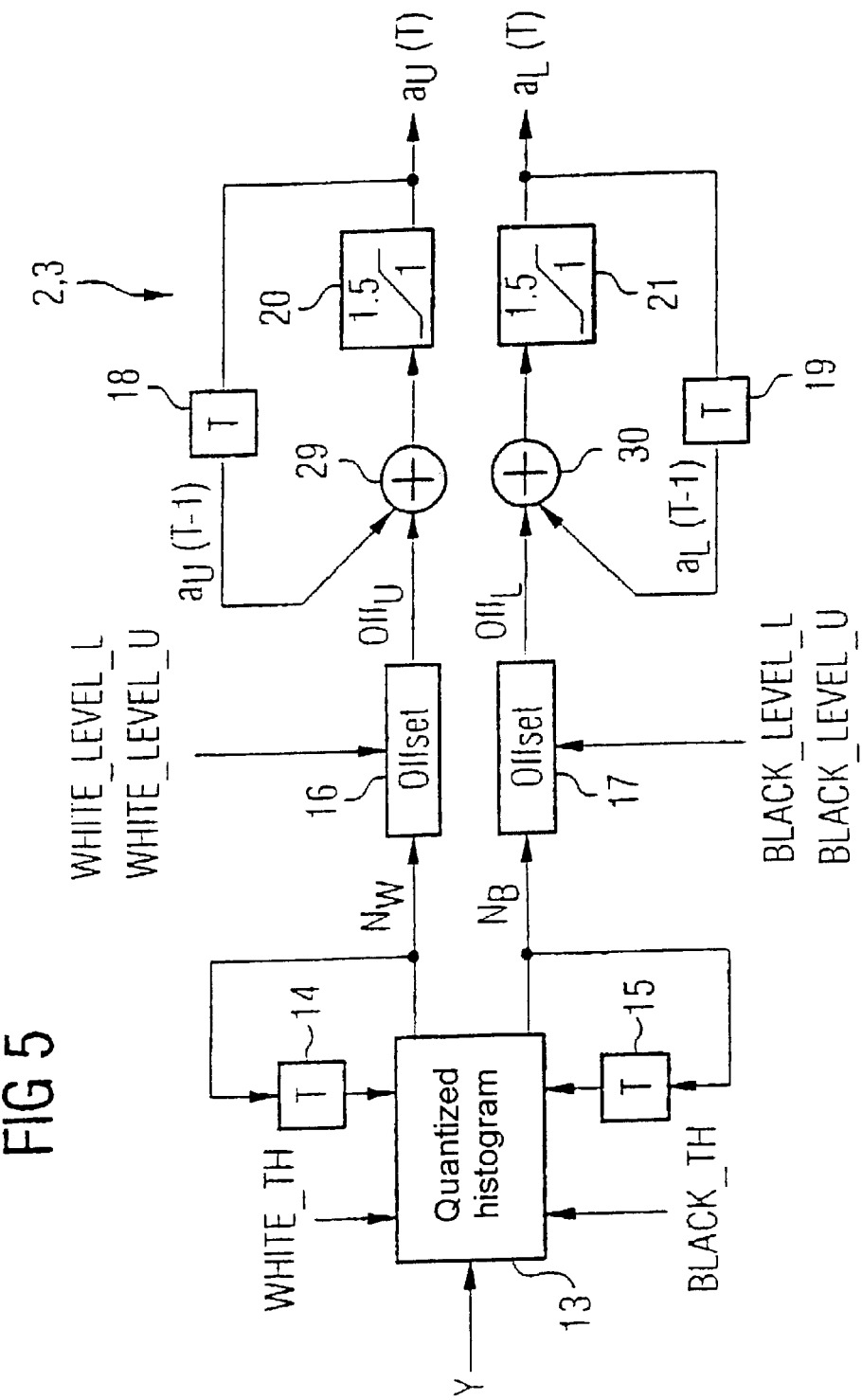
FIG. 5 shows the construction of units for determining the slope factors of the transformation functions as shown in FIG. 1.
Figure 6A:
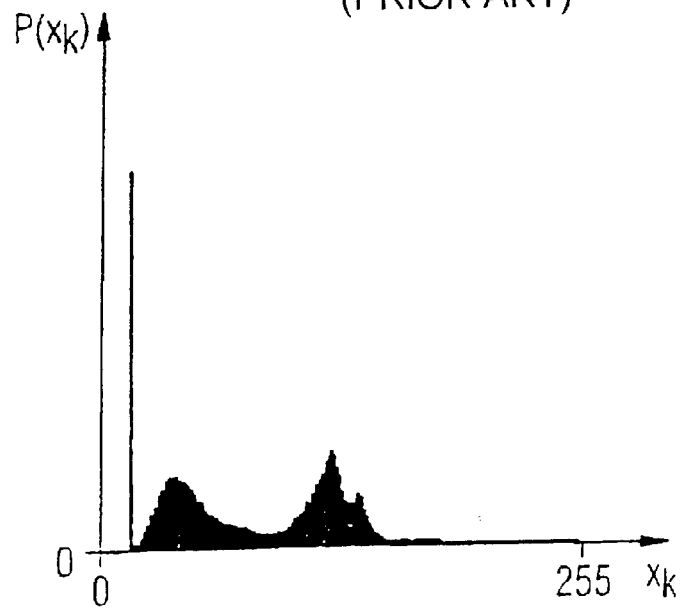
FIGS. 6A and 6B show representations for elucidating the mode of operation of conventional histogram spreading.
Figure 6B:
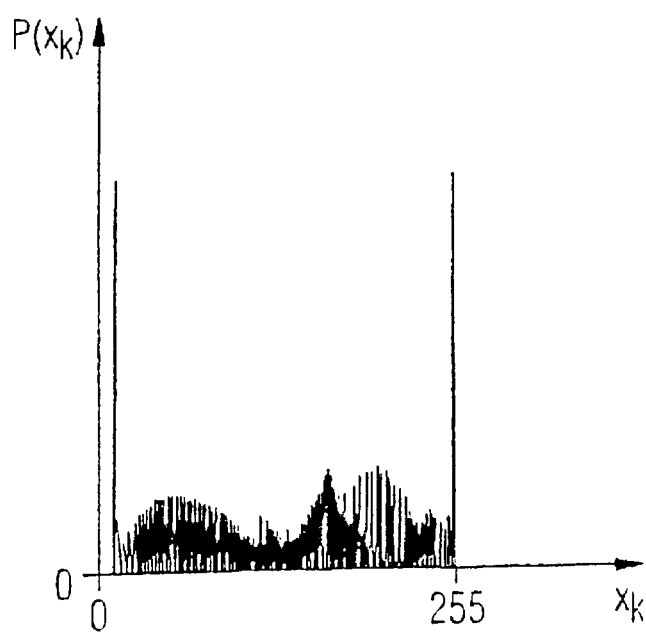
Figure 7:
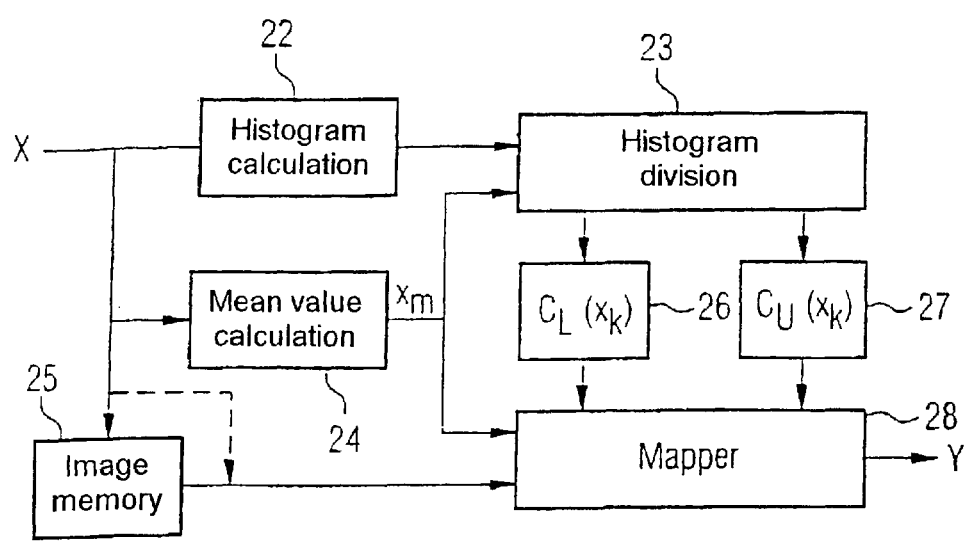
FIG. 7 shows a simplified block diagram of a circuit arrangement for realizing the contrast enhancement of an input image in accordance with the prior art.

The aim of the output-side control loop shown in FIG. 5 must be, in the case of a small dynamic range of the input image, to enhance the contrast by spreading the dynamic range, which correlates with raising the slope factor of the corresponding transformation function. As soon as the contrast has improved, the slope should as far as possible be maintained. With "good" contrast (i.e., with sufficient utilization of the dynamic range in the input image) the slope should, on the other hand, as far as possible assume the value 1 or, in the case of an instantaneous slope value greater than 1, the latter should be decreased by control to the value 1.

In order to realize the above-described aim, provision is made of a unit 13 for calculating a quantized histogram of the output image of the mapper 4. However, only two values are of interest from this quantized histogram, namely the values $N_B$ and $N_W$, where $N_B$ represents the number of pixels of the output image Y whose brightness is less than or equal to a lower limit value BLACK__TH, while $N_W$ represents the number of pixels of the output image Y whose brightness is greater than or equal to an upper limit value WHITE__TH. In the present exemplary embodiment, BLACK__TH=16 and WHITE__TH=240. The values $N_B$ and $N_W$ are a measure of the extent to which the dynamic range is utilized at the lower and upper end, respectively, of the range of values. The circuit elements connected downstream of the unit 13 have the task of evaluating these values to determine the increase and decrease, respectively, of the slope factors $a_L$ and $a_U$, which will be explained in more detail below.

The values $N_B$ and $N_W$, respectively, are compared, by offset value determining units 17 and 16, respectively, in each case with a further lower and, respectively, upper limit value BLACK_LEVEL__L and WHITE_LEVEL__L and, respectively, BLACK_LEVEL__U and WHITE_LEVEL__U, in order to determine, as a function thereof, a corresponding offset value $OFF_L$ and $OFF_U$, respectively. In this case, the values $OFF_L$ and $OFF_U$ are each selected from the set {-OFFSET, 0, OFFSET} and subsequently added, with the aid of addition units 30 and 29, respectively, to the corresponding slope value of the preceding image, which are fed via delay elements 19 and 18, respectively, to the addition units 30 and 29, respectively, with the result that the following holds true for the new slope factor:

$$a_{L/U}(T)=a_{L/U}(T-1)+\text{Off}_{L/U} \tag{15}$$

This procedure prevents switching artifacts and bounce artifacts if the value OFFSET is chosen to be sufficiently low. In the present embodiment, by way of example, a value of the OFFSET=128 is chosen.

If the value $N_B$ and $N_W$, respectively, is less than the corresponding lower limit value BLACK_LEVEL__L and WHITE_LEVEL__L, respectively, the value +OFFSET is chosen for $Off_L$ and $Off_U$, respectively, and the slope is thus increased, whereas the value -OFFSET is chosen for $Off_L$ and $Off_U$, respectively, and the slope is thus decreased, if $N_B$ and $N_W$, respectively, is greater than the corresponding upper limit value BLACK_LEVEL__U and WHITE_LEVEL__U, respectively. In all other cases, the value 0 is chosen for $Off_U$ and $Off_L$, with the result that the slope of the corresponding transformation function remains unchanged.

Since the image quality and hence the contrast of the output image are never to be worse than those of the input image, a respective slope limiting unit 21 and 20 is provided in the output path of the unit 2 and 3, respectively. These slope limiting units in each case limit the corresponding slope factor to the minimum value 1, thereby ensuring that the contrast of the output image can never be impaired relative to the input image. Moreover, the corresponding slope factor is restricted to the maximum value 1.5 in order to avoid elevating the contrast to an excessively great extent and thus in a way that goes beyond what is natural.

Consequently, with the aid of the described method and apparatus above, it is possible for the contrast of the input image to be distinctly enhanced, without impairing the overall impression.

According to the disclosed method in accordance with the teachings of the invention, the input image is subdivided into sub-images, the first sub-image comprising those pixels which have a brightness less than the mean brightness of the input image, while the second sub-image comprises those pixels which have a brightness greater than the mean brightness. Analogously to the prior art described previously, the brightness values of the two sub-images are processed in accordance with different transformation functions and the brightness values thus transformed are combined to form a contrast-enhanced output image.

According to the teachings of the invention, however, straight-line functions having variable slope factors are used as the transformation functions, the slope factors each being determined on the basis of an analysis of the output image. In this way, the contrast contained in the instantaneous image can be taken into account when defining the transformation functions. In particular, the function $f_L(x_k)=x_m+(x_k-x_m)*a_L$ is used as the transformation function for the first sub-image, while the function $f_U(x_k)=x_m+(x_k-x_m)*a_U$ is used as the transformation function for the second sub-image, where $x_m$ denotes the mean brightness value, $x_k$ denotes the respective brightness value to be processed, $a_L$ denotes the slope factor of the transformation function $f_L(x_k)$ and $a_U$ denotes the slope factor of the transformation function $f_U(x_k)$. Consequently, instead of a complex calculation of the cumulative density functions, as is necessary in the prior art described in the introduction, according to the invention all that is required is the calculation of two slope factors.

During the calculation of the value of the mean brightness of the input image and of the two slope factors, it is taken into account that successive images have a high degree of correlation, so that it is possible to dispense with an image memory for buffer-storing the input image. The results of the calculation of the mean brightness value and of the slope factors are in each case available to the mapper for the subsequent image.

For the calculation of the mean brightness and also of the slope factors of the two transformation functions, proposals are made which ensure that the mean brightness is maintained and the image quality is at least just as good as that of the input image even after the contrast enhancement. Overmodulation artifacts, switching artifacts and bounce artifacts can be reliably avoided in the case of the contrast enhancement according to the teachings of the invention.

The foregoing description has been presented for the purposes of illustration and description. It is not intended to be exhaustive or to limit the teaching of the invention to the exemplary embodiments disclosed. Many modifications and variations are possible in light of the above teachings and it is intended that the scope of the invention be limited not by this detailed description, but rather by the claims appended hereto.

What is claimed is:

1. A method for enhancing the contrast of an image, the image being composed of a multiplicity of pixels each having a specific brightness value, the method comprising the steps of:
   a) determining a mean brightness value of the individual pixels of the image;
   b) processing the brightness values of those pixels of the image that have a brightness less than or equal to the mean brightness value, in accordance with a first transformation function;
   c) processing the brightness values of those pixels of the image that have a brightness greater than the mean brightness value, in accordance with a second transformation function; and
   d) outputting the pixels having the brightness values processed in steps b) and c), respectively, in the form of a transformed output image;
   wherein a first straight-line function having a first variable slope factor is the first transformation function and the second transformation function is a second straight-line function having a second variable slope factor, the first slope factor of the first straight-line function and the second slope factor of the second straight-line function being determined by an analysis of the transformed output image.

2. The method as claimed in claim 1, wherein a function $f_L(x_k)=x_m+(x_k-x_m)*a_L$ is used as the first transformation function, and a function $f_U(x_k)=x_m+(x_k-x_m)*a_U$ is used as the second transformation function, where $x_m$ denotes the mean brightness value, $x_k$ denotes the respective brightness value to be processed, $a_L$ denotes the first slope factor of the first transformation function $f_L(x_k)$ and $a_U$ denotes the second slope factor of the second transformation function $f_U(x_k)$.

3. The method as claimed in claim 1, wherein the brightness values processed in accordance with the first transformation function are limited to a lower limit value when a brightness value less than the lower limit value results after the processing in accordance with the first transformation function, and the brightness values processed in accordance with the second transformation function are limited to an upper limit value when a brightness value greater than the upper limit value results after the processing in accordance with the first transformation function.

4. The method as claimed in claim 1, wherein the mean brightness value is determined by reducing the number of pixels of the image and calculating a quantized histogram for the image with the reduced pixels, from which histogram the mean brightness value is derived.

5. The method as claimed in claim 4, wherein the number of pixels of the image is reduced by low-pass filtering the image twice, each occurrence of filtering having an associated subsequent subsampling.

6. The method as claimed in claim 5, wherein the number of pixels is reduced by a factor 8 with each subsampling.

7. The method as claimed in claim 4, wherein the mean brightness value is calculated using the quantized histogram in accordance with the formula:

$$x_m = \left(q_{\max} * \frac{L}{q}\right) + \frac{L}{2q}$$

where $x_m$ denotes the mean brightness value, L denotes the number of possible brightness values, q denotes the number of quantization levels of the quantized histogram and $q_{max}$ denotes the number of the quantization level having a maximum value of the quantized histogram, where $0 \leq q_{max} \leq q-1$.

8. The method as claimed in claim 7, wherein when the quantized histogram has a plurality of quantization levels having the maximum value, the rounded-down mean value of the numbers of the quantization levels having the maximum value is used as a value for $q_{max}$.

9. The method as claimed in claim 4, wherein the quantized histogram has eight quantization levels for 256 possible brightness values.

10. The method as claimed in claim 4, wherein the step of determining the mean brightness value further comprises:
   comparing the mean brightness value of the image with a mean brightness value of the preceding image and, dependent on a result of the comparison, an offset value is selected from a set comprising a plurality of discrete offset values and is added to the mean brightness value of the preceding image to achieve a resultant sum that is used as the mean brightness value for steps b) and c).

11. The method as claimed in claim 10, wherein the discrete offset values include −1, 0 and 1.

12. The method as claimed in claim 1, wherein the first slope factor of the first straight-line function and the second slope factor of the second straight-line function are determined by an analysis of the brightness distribution of the transformed output image.

13. The method as claimed in claim 12, wherein a corresponding offset value is produced for each of the first and second slope factors as a function of the analysis of the brightness distribution of the transformed output image and is added to corresponding slope factors determined for the preceding image, in order to obtain the slope factors used for the processing of the instantaneous image in accordance with steps b) and c).

14. The method as claimed in claim 13, wherein one of a value −OFFSET, 0, and +OFFSET is optionally used as the offset value, dependent on the analysis of the output image, where OFFSET denotes the magnitude of the offset value.

15. The method as claimed in claim 14, wherein OFFSET=1/128.

16. The method as claimed in claim 14, wherein during analysis of the brightness distribution of the transformed output image, a first number of pixels contained in the transformed output image having a brightness value less than or equal to a lower limit value is determined, a second number of pixels contained in the transformed output image having a brightness value greater than or equal to an upper limit value is determined, and both the first number of pixels and the second number of pixels are each compared with respective further upper and lower limit values in order to choose one of the values −OFFSET, 0 and +OFFSET in each case depending on the comparison result for the offset values of the slope factors.

17. The method as claimed in claim 16, wherein the value −OFFSET is chosen for the offset values of the slope factors of the first and second straight-line functions, respectively, when the first and second number of pixels respectively, are greater than the corresponding further upper limit values, the value +OFFSET is chosen for the offset values of the slope factor of the first and second straight-line functions, respectively, when the first and second number of pixels, respectively, are less than the corresponding further lower limit values and in all other cases the value 0 is chosen for offset values for the slope factors of the first and second straight-line function, respectively.

18. The method as claimed in claim 16, wherein a value of 16 is chosen as the lower limit value and a value of 240 is chosen as the upper limit value.

19. The method as claimed in claim 1, wherein the slope factors of the first and second straight-line functions are in each case limited to a maximum slope factor value of 1.5 and a minimum slope factor value of 1.

20. A circuit arrangement for enhancing the contrast of an image, wherein the image is comprised of a plurality of individual pixels each having a specific brightness value, the circuit arrangement comprising:
   a mean value calculation unit configured to determine a mean brightness value of the individual pixels of the image;
   a first transformation function calculation unit configured to determine a first transformation function that is used to process a first set of pixels of the image having a brightness less than or equal to the mean brightness value;
   a second transformation function calculation unit configured to determine a second transformation function that is used to process a second set of pixels of the image having a brightness greater than the mean brightness value; and
   an image processing unit configured for processing the brightness values of the first set of pixels of the image in accordance with the first transformation function and the brightness values of the second set of pixels of the image in accordance with the second transformation function and for outputting the processed pixels in the form of a transformed output image;
   wherein the first and second transformation function calculation units are further configured to respectively determine a first straight-line function and a second straight-line function by analyzing the transformed output image; the first and second straight-line functions respectively having a variable slope factor as the corresponding first and second transformation functions.

21. The circuit arrangement as claimed in claim 20, wherein:
   the first transformation function calculation unit determines the function $f_L(x_k)=x_m+(x_k-x_m)*a_L$ as the first transformation function, and
   the second transformation function calculation unit determines the function $f_U(x_k)=x_m+(x_k-x_m)*a_U$ as the second transformation function,
   where $x_m$ denotes the mean brightness value determined by the mean value calculation unit, $x_k$ denotes the respective brightness value to be processed, $a_L$ denotes the variable slope factor of the first transformation function $f_L(x_k)$, and $a_U$ denotes the variable slope factor of the second transformation function $f_U(x_k)$.

22. The circuit arrangement as claimed in claim 20, wherein the mean value calculation unit further comprises:
   at least one subsampling device in order to reduce the number of pixels of the image; and a quantized histogram calculation unit that is configured to calculate a quantized histogram of the image having the reduced pixels and to determine the mean brightness value in accordance with the formula:

$$x_m = \left(q_{\max} * \frac{L}{q}\right) + \frac{L}{2q}$$

where $x_m$ denotes the mean brightness value, L denotes the number of possible brightness values, q denotes the number of quantization levels of the quantized histogram and $q_{max}$ denotes the number of the quantization level having the maximum value of the quantized histogram, where $0 \leq q_{max} \leq q-1$.

23. The circuit arrangement as claimed in claim 22, wherein when the quantized histogram has a plurality of quantization levels with the maximum value, the quantized histogram calculation unit uses a rounded-down mean value of the numbers of the quantization levels having the maximum value as a value for $q_{max}$.

24. The circuit arrangement as claimed in claim 22, wherein the mean value calculation unit further comprises:
   an offset calculating unit that is configured to compare the mean brightness value of the image, the mean brightness value having been determined by the quantized histogram calculation unit, with a mean brightness value of a preceding image and select an offset value from a set comprising a plurality of discrete offset values and add the offset value to the value of the mean brightness of the preceding image depending on the comparison to achieve a sum, wherein the sum is fed as the mean brightness value to the first and second transformation function calculation units.

25. The circuit arrangement as claimed in claim 20, wherein:

the first transformation function calculation unit is assigned a pixel number determining device that is configured to determine a first number of pixels contained in the transformed output image, wherein the first number of pixels have a brightness value less than or equal to a lower limit value;

the second transformation function calculation unit is assigned the pixel number determining device that is further configured to determine a second number of pixels contained in the transformed output image, wherein the second number of pixels have a brightness value greater than or equal to an upper limit value;

the first and second transformation function calculation units are comprised of respective offset value determining units, which are configured to compare the first number of pixels and the second number of pixels, respectively, with corresponding further limit values in order to determine, dependent on results of the comparisons, first and second offset values, respectively, for the slope factor of the first and second straight-line functions, respectively; and the first and second transformation function calculation units are each further comprised of a respective addition units configured for adding the first and second offset values, respectively, to the corresponding slope factors determined for the preceding image in order to obtain the respective slope factors of the first and second straight-line functions for the image that is to be presently processed.

26. The circuit arrangement as claimed in claim 25, wherein the offset value determining units are each configured to set the corresponding offset value to one of the values −OFFSET, 0 and +OFFSET dependent on the result of the comparison.

27. The circuit arrangement as claimed in claim 26, wherein the OFFSET=1/128.

28. The circuit arrangement as claimed in claim 20, wherein the first and second transformation function calculation units each further comprise slope factor limiting units configured for limiting the determined slope factor of the first and second straight-line functions, respectively, to a maximum slope factor value of 1.5 and a minimum slope factor value of 1.

* * * * *